(12) United States Patent
Squillante et al.

(10) Patent No.: US 6,384,330 B1
(45) Date of Patent: May 7, 2002

(54) MODULAR DISTRIBUTING FRAME FOR SUPPORTING TELEPHONE CONNECTOR BLOCKS

(75) Inventors: Alan J. Squillante, Kings Park; Anthony Ray, Massapequa Park, both of NY (US)

(73) Assignee: Porta Systems Corporation, Syosset, NY (US)

( * ) Notice: Subject to any disclaimer, the term of this patent is extended or adjusted under 35 U.S.C. 154(b) by 0 days.

(21) Appl. No.: 09/540,927

(22) Filed: Mar. 31, 2000

(51) Int. Cl.$^7$ .............................................. G02B 11/00
(52) U.S. Cl. ...................... 174/50; 361/823; 361/827; 385/134; 379/327
(58) Field of Search .................. 174/50, 54, 61, 174/17 R; 385/134, 135; 361/823, 827; 379/325, 326, 327

(56) References Cited

U.S. PATENT DOCUMENTS

| | | |
|---|---|---|
| 2,098,321 A | 11/1937 | Treptow |
| 3,711,053 A | 1/1973 | Drake |
| 4,002,856 A | 1/1977 | Sedlacek et al. |
| 4,117,273 A | 9/1978 | Gautier et al. |
| 4,158,754 A * | 6/1979 | Yonezaki et al. ........... 379/328 |
| 4,204,095 A | 5/1980 | De Luca et al. |
| 4,313,039 A | 1/1982 | De Luca et al. |
| 4,390,755 A * | 6/1983 | Pierresteguy ................ 379/327 |
| 4,470,102 A | 9/1984 | De Luca et al. |
| 4,512,622 A | 4/1985 | Carney et al. |
| 4,630,886 A * | 12/1986 | Lauriello et al. ........... 385/135 |
| 4,649,236 A | 3/1987 | De Luca et al. |
| 4,694,488 A | 9/1987 | Mickelson et al. |
| 4,722,702 A | 2/1988 | De Luca et al. |
| 4,737,985 A | 4/1988 | De Luca et al. |
| 4,753,606 A | 6/1988 | De Luca et al. |
| 4,759,057 A | 7/1988 | De Luca et al. |
| 4,811,169 A | 3/1989 | De Luca et al. |
| 4,824,403 A | 4/1989 | De Luca et al. |
| 4,866,575 A | 9/1989 | Mickelson et al. |
| 4,995,688 A * | 2/1991 | Anton et al. ................ 350/96.1 |
| 5,153,819 A * | 10/1992 | Hebel .......................... 361/429 |
| 5,220,600 A | 6/1993 | Chounard et al. |
| 5,402,515 A * | 3/1995 | Vidacovich et al. ......... 385/135 |
| 5,422,946 A * | 6/1995 | Delakowitz et al. ......... 379/327 |
| 5,521,973 A * | 5/1996 | Peng ............................ 379/329 |
| 5,758,003 A | 5/1998 | Wheeler et al. |
| 6,256,444 B1 * | 7/2001 | Bechamps et al. ........... 385/134 |

OTHER PUBLICATIONS

ADC Telecommunications literature—("DSX–1 Digital Signal Cross–Connect Super High Density Bays"); Place of Publication: United States; Copyright: 1994, 1998.
ADC Telecommunications literature—("Fiber Distribution Frame User Manual"); Place of Publication: United States; Copyright: 1999.
ADC Telecommunications literature obtained from the internet on Mar. 2, 2000; Copyright: Unknown.
Porta Systems Corp. literature—("CAM VI DF Computer Administered Modular Distributing Frames: Technical Manual PRTA 201–301–106"); Place of Publication: United States; Copyright: 1992.
Porta Systems Corp. literature—("Frame Book"); Place of Publication: United States; Date of Publication: Jan. 1997.
Reltec Corporation literature—("CODS2 Central Office Distribution System") Place of Publication: United States; Copyright: 1998.

* cited by examiner

Primary Examiner—Anthony Dinkins
Assistant Examiner—Adolfo Nino
(74) Attorney, Agent, or Firm—Hoffmann & Baron, LLP

(57) ABSTRACT

A modular distributing frame for supporting telephone connector blocks for single person front jumper administration. The connector blocks are mounted in vertical columns having vertical troughs on both sides. Horizontal troughs are located at the top, bottom and an intermediate location while being in the same plane as the vertical troughs.

20 Claims, 19 Drawing Sheets

MODULAR DISTRIBUTING FRAME FOR SUPPORTING TELEPHONE CONNECTOR BLOCKS

BACKGROUND OF THE INVENTION

1. Field of the Invention

The present invention relates to the field of telephony, and more particularly a new modular distributing frame for supporting telephone connector blocks.

2. Description of the Prior Art

Telephone distributing frames are well known in the art and generally are adapted for use in conjunction with equipment found in a telephone distribution centers or another remote location for connection to office equipment for switching or other processing. The distributing frame equipment serves as an interface between the switching equipment (the inside plant or central office equipment) and cable network of subscriber lines (the outside plant or line). Conventional frames feature a skeletonized frame adapted to support various types of telephone connector blocks. The telephone connector blocks provide connection points for the attachment of subscriber pairs and equipment pairs generally on separate connector blocks. Removable jumper wires are used to connect the separate connector blocks. One of the connector blocks generally has incorporated therein protecting devices connected in series with either the subscriber or equipment pairs. The connector blocks also provide access for the testing of circuits for various defects. Examples of connector blocks known in the art are disclosed in the following United States Patents:

U.S. Pat. No. 4,512,622 to Carney et al: Apr. 23, 1985
U.S. Pat. No. 4,722,702 to DeLuca et al: Feb. 2, 1988
U.S. Pat. No. 4,753,606 to DeLuca et al: Jun. 28, 1988

All of the aforementioned connector block patents are assigned to the assignee of the present application and the disclosure of which are incorporated herein by reference.

Modular distributing frames assemblies have been developed which employ consolidated designs having portions pre-wired in an effort to optimize use of floor space while reducing installation time. Examples of such prior art designs are disclosed in the following U.S. Patents:

U.S. Pat. No. 4,002,856 to Sedlacek: Jan. 11, 1977
U.S. Pat. No. 4,117,273 to Gautier: Sep. 26, 1978
U.S. Pat. No. 4,204,095 to DeLuca: May 20, 1980
U.S. Pat. No. 4,313,039 to DeLuca: Jan. 26, 1982
U.S. Pat. No. 4,470,102 to DeLuca et al: Sep. 4, 1984
U.S. Pat. No. 4,694,488 to Mickelson et al.: Sep. 15, 1987
U.S. Pat. No. 4,866,575 to Mickelson et al.: Sep. 12, 1989

While the prior art has provided improvements in the modular distributing frame art, there is a need for distributing frames that are truly modular so that the frame can be easily tailored to fit within an allocated area while optimizing the use of the area.

OBJECTS AND SUMMARY OF THE INVENTION CENTER

It is an object of the present invention to provide a modular distributing frame which can be easily tailored to suit the space allocated for the installation of the frame.

It is another object of the present invention to provide a modular distributing frame that is designed for single person front jumper administration.

It is yet another object of the invention to provide a modular distributing frame that can be equipped with any ratio of outside plant lines to inside plant lines as required by the user.

In accordance with one form of the present invention, a modular distributing frame for supporting a plurality of telephone connector blocks which interface inside and outside cable pairs through wire jumpers electrically coupled to the telephone connector blocks includes a base, a plurality of posts, an upper trough, and a plurality of longitudinal troughs. The base forms a lower trough and runs substantially horizontally. The plurality of posts which support the plurality of telephone connector blocks each have a first end and a second end. The first end of the post is connected to the base. The upper trough is connected to the second end of the post and runs substantially horizontally. Each of the longitudinal troughs is connected to one of the plurality posts while running substantially vertically and intersecting the lower trough and the upper troughs. Preferably the lower and upper troughs have first and third side walls respectively and longitudinal troughs have bottom panels with the third side wall and the bottom panels defining a plane, and the first side wall being arranged to intersect the plane at the first end of each of the plurality of posts. The posts preferably have a rectangular tubular cross section.

In accordance with another form of the present invention, a modular distributing frame for supporting a plurality of telephone connector blocks which interface inside and outside cable pairs through wire jumpers electrically coupled to the telephone connector blocks includes a base, a plurality of posts, a central trough, an upper trough, and a plurality of bottom and top troughs. The base forms a lower trough and runs substantially horizontally. The plurality of posts which support the plurality of telephone connector blocks each have a first end and a second end and an intermediate portion. The first end of the post is connected to the base. The central trough is connected to the intermediate portion of the post and runs substantially horizontally. The upper trough is connected to the second end of the post and runs substantially horizontally. Each of the bottom troughs is connected to one of the plurality posts while running substantially vertically and intersecting the lower trough and the center troughs. Each of the top troughs is connected to one of the posts while running substantially vertically and intersecting the center trough and upper trough. Preferably the center and upper troughs have second and third side walls respectively and the bottom and top troughs have first and second bottom panels respectively with the second and third side walls defining a plane with the first and second bottom panels being arranged in the plane. Most preferably, the lower trough has a first side wall that is arranged to intersect the plane at the first end of each of the plurality of posts. The posts preferably have a rectangular tubular cross section.

In accordance with another form of the invention a modular distribution frame for interfacing for inside and outside cable pairs through wire jumpers electrically coupled to the frame includes a base, and plurality of posts, an upper trough, a plurality of longitudinal troughs, and a plurality of telephone connector blocks. The base forms a lower trough and runs substantially horizontally. The plurality of posts which support the plurality of telephone connector blocks each have a first end and a second end The first end of the post is connected to the base. The upper trough is connected to the second end of the post and runs substantially horizontally. Each of the longitudinal troughs is connected to one of the plurality posts while running substantially vertically and intersecting the lower trough and the upper troughs. The telephone connector blocks are arranged between and connected to a pair of the plurality of posts. Each of the blocks have a first face that is located in a second plane that intersects the lower trough and has a plurality of connectors located on the first base for electrically coupling the jumper wires. Preferably the frame includes a plurality of subframes for connecting the blocks to the posts. Each subframe is preferably connected to one block and to a pair of the plurality of posts. Preferably at least one of the blocks includes an electrically coupled protector field having a second face that is located in a third plane that is parallel to the second plane. The protector field is preferably attached to the subframe. Preferably each of the subframes have a similarly configured mounting arrangement so that each subframe is interchangeable for attachment to the posts. Preferably the lower and upper troughs have first and third side walls respectively and longitudinal troughs have bottom panels with the third side wall and the bottom panels defining a plane, and the first side wall being arranged to intersect the plane at the first end of each of the plurality of posts.

In accordance with another form of the invention a modular distribution frame for interfacing for inside and outside cable pairs through wire jumpers electrically coupled to the frame includes a base, and plurality of posts, a center trough, an upper trough, a plurality of bottom troughs, a plurality of top troughs, and a plurality of telephone connector blocks. The base forms a lower trough and runs substantially horizontally. The plurality of posts which support the plurality of telephone connector blocks each have a first end and a second end and an intermediate portion. The first end of the post is connected to the base. The central trough is connected to the intermediate portion of the post and runs substantially horizontally. The upper trough is connected to the second end of the post and runs substantially horizontally. Each of the bottom troughs is connected to one of the plurality posts while running substantially vertically and intersecting the lower trough and the center troughs. Each of the top troughs is connected to one of the posts while running substantially vertically and intersecting the center trough and upper trough. The telephone connector blocks are arranged between and connected to a pair of the plurality of posts. Each of the blocks have a first face that is located in a second plane that intersects the lower trough and has a plurality of connectors located on the first base for electrically coupling the jumper wires. Preferably the frame includes a plurality of subframes for connecting the blocks to the posts. Each subframe is preferably connected to one block and to a pair of the plurality of posts. Preferably at least one of the blocks includes an electrically coupled protector field having a second face that is located in a third plane that is parallel to the second plane. The protector field is preferably attached to the subframe. Preferably each of the subframes have a similarly configured mounting arrangement so that each subframe is interchangeable for attachment to the posts. Preferably the center and upper troughs have second and third side walls respectively and the bottom and top troughs have first and second bottom panels respectively with the second and third side walls defining a plane with the first and second bottom panels being arranged in the plane. Most preferably the lower trough has a first side wall that is arranged to intersect the plane at the first end of each of the plurality of posts.

These and other objects, features and advantages of the present invention will become apparent from the following detailed description of illustrative embodiments thereof, which is to be read in conjunction with the drawings.

DETAILED DESCRIPTION OF THE PREFERRED EMBODIMENTS

Figure 1:
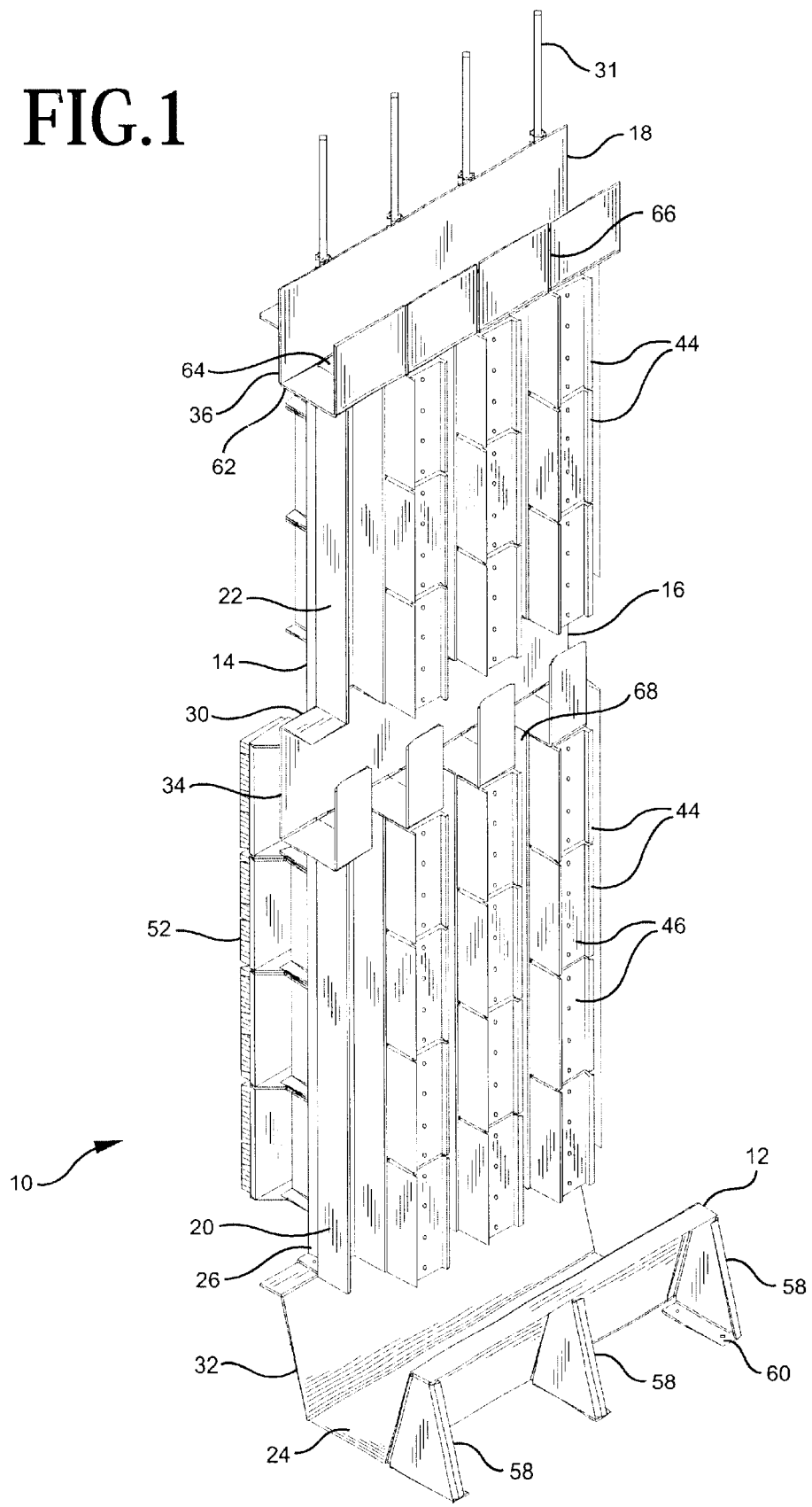
FIG. 1 is a front perspective view of a modular distributing frame shown supporting a plurality of telephone connector blocks in accordance with the present invention.
Figure 2:
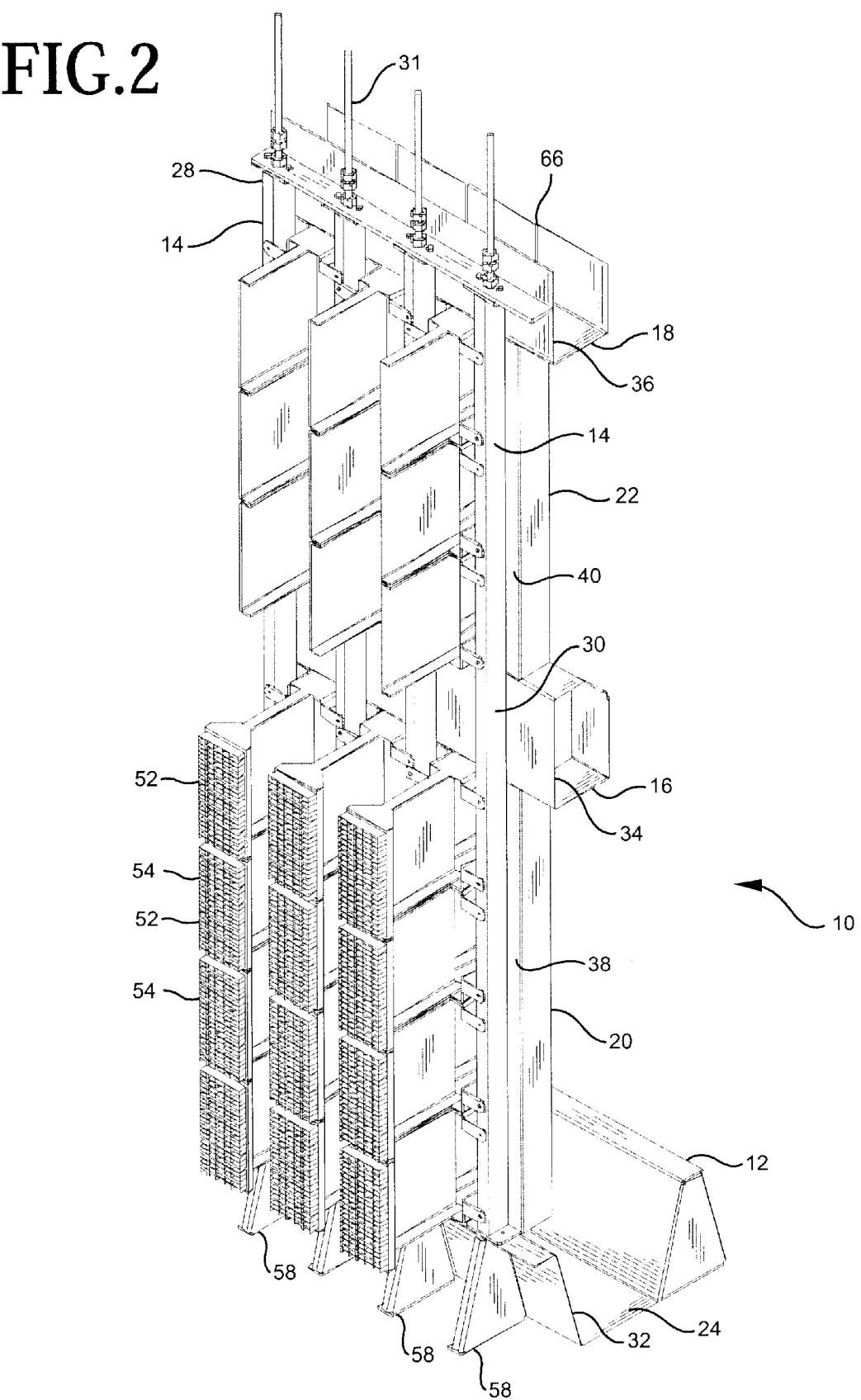
FIG. 2 is a rear perspective view of the distributing frame shown in FIG. 1.
Figure 6:
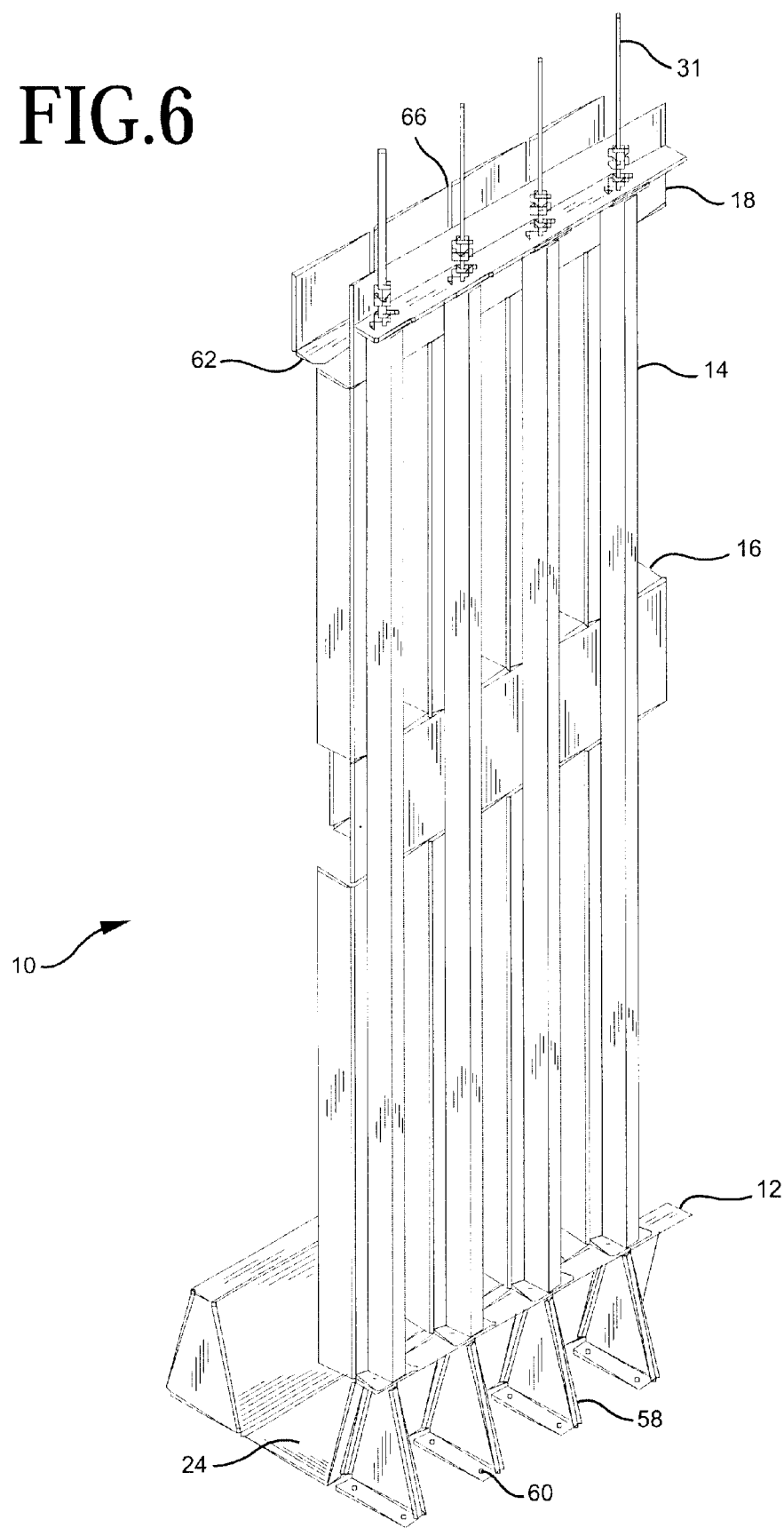
FIG. 6 is a rear perspective view of a modular distributing frame shown without the telephone connector blocks in accordance with the present invention.

Initially referring to FIGS. 1, 2 and 6, a modular distributing frame 10 in accordance with the present invention is depicted. The frame 10 includes a base 12, a plurality of posts 14, an upper trough 18, a plurality of bottom troughs 20, and a plurality of top troughs 22. Preferably the frame 10 also includes a center trough 16. The frame 10 supports a plurality of telephone connector blocks 44 which interface inside and outside cable pairs (not shown) through wire jumpers (not shown) which are electrically coupled to the plurality of telephone connector blocks 44. The frame 10 is generally made from formed sheet metal parts that are connected together either by fasteners such as bolts and rivets, or by welding.

Figure 8:
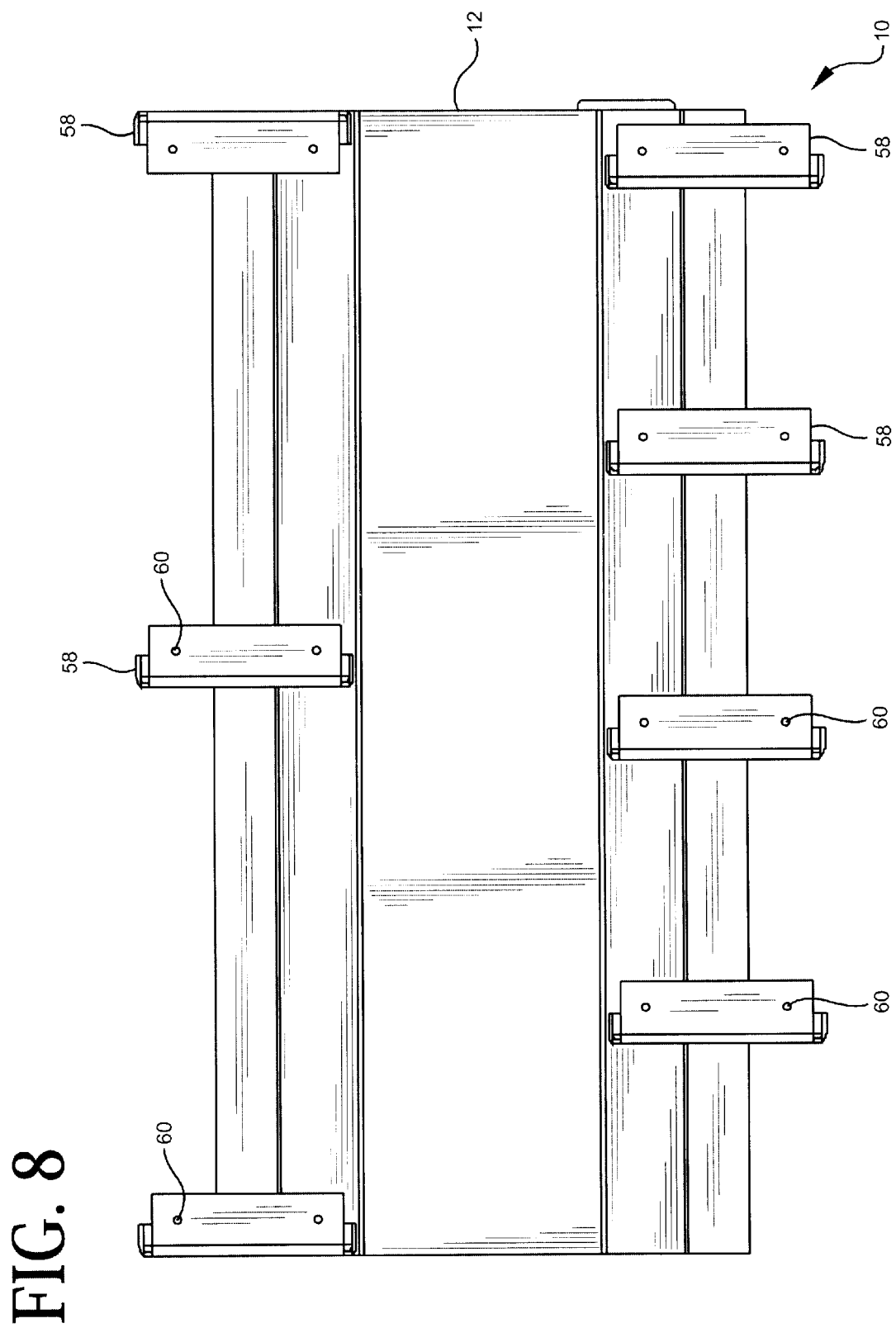
FIG. 8 is a bottom view of the distributing frame shown in FIG. 6.

The base 12 forms a lower trough 24 which runs substantially horizontally. The lower trough 24 has walls including a first side wall 32 which define a channel as shown in FIGS. 1 and 2. Preferably the base 12 includes a plurality of base panels 58 located on both sides along the length of the base 12. The base panels 58 are provided with mounting holes 60 for attachment to the floor. The layout of the base panel 58 with the mounting holes 60 is shown in FIG. 8. The base panels 58 also serve to stiffen the base 12 for supporting the weight of the frame 10 and the telephone connector blocks 44 mounted thereto. Preferably the base panels 58 are equipped with leveling feet such as a threaded rod or the like for leveling the frame 10.

Figure 4:
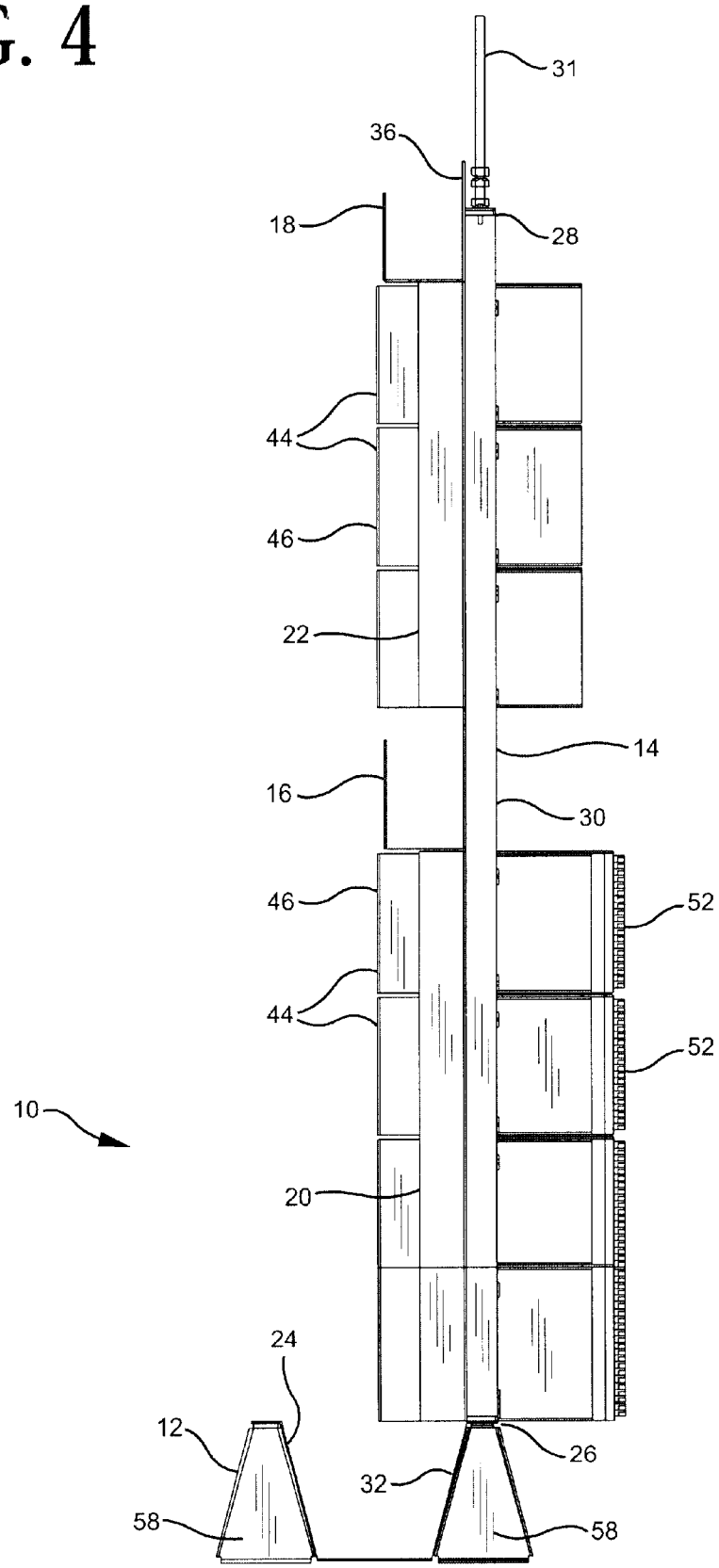
FIG. 4 is a side elevational view of the distributing frames shown in FIG. 1.
Figure 5:
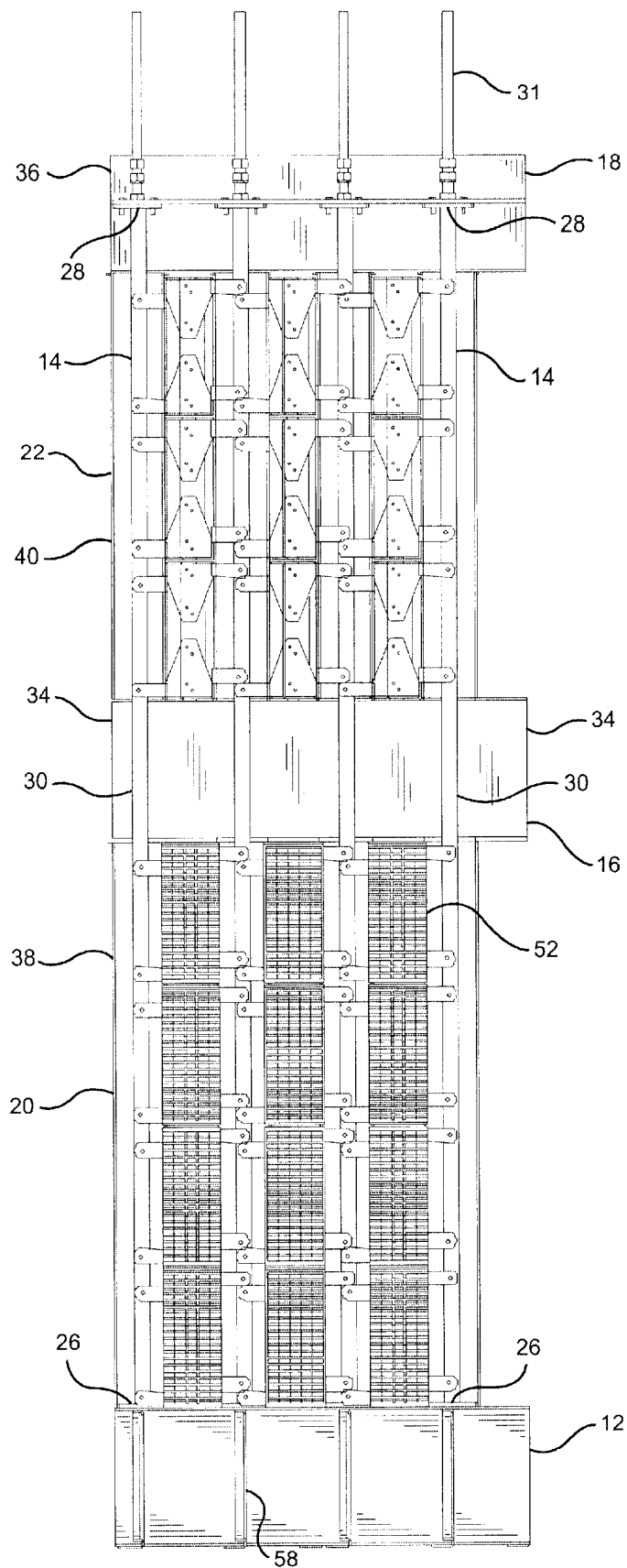
FIG. 5 is a rear elevational view of the distributing frame shown in FIG. 1.

Each of the plurality of posts 14 have a first end 26, a second end 28 and an intermediate portion 30. The first end 26 is connected to the base 12 as shown in FIGS. 1 and 4. The plurality of posts 14 support the plurality of telephone blocks 44 as shown in FIGS. 2 and 5. Preferably as shown in FIGS. 2 and 6, the posts 14 are made from tubular steel having a rectangular cross-section. When installing the frame 10 in a building it is preferred to provide lateral support to the posts 14 at the second end 28. As shown in FIG. 1, the frame 10 can include stabilizer rods 31 connected at the second end 28 of the posts 14 to provide the lateral support. The free end of the stabilizer rods 31 are generally attached to the building to brace the posts 14 at the second end 28.

Figure 3:
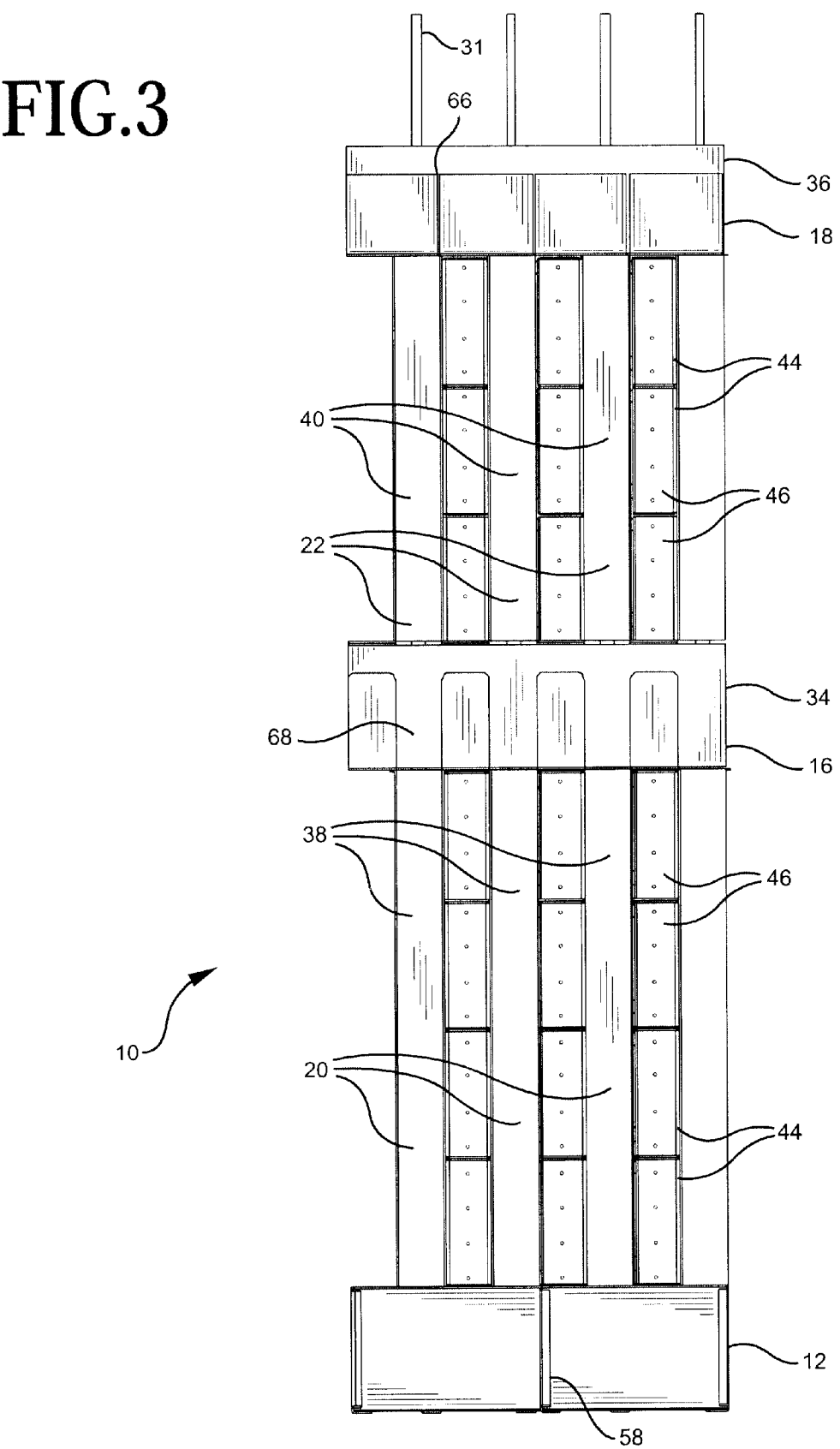
FIG. 3 is a front elevational view of the distributing frame shown in FIG. 1.

When a center trough 16 is provided, the center trough 16 is connected to the intermediate portion 30 of each of the plurality of posts 14 and runs substantially horizontally. The center trough 16 has walls including a first side wall 32 that define a channel. As shown in FIGS. 1 and 3, the center trough 16 is formed with vertical-trough openings 68 which are configured to ensure communication between the center trough 16 and the bottom and top troughs 20, 22.

Figure 7:
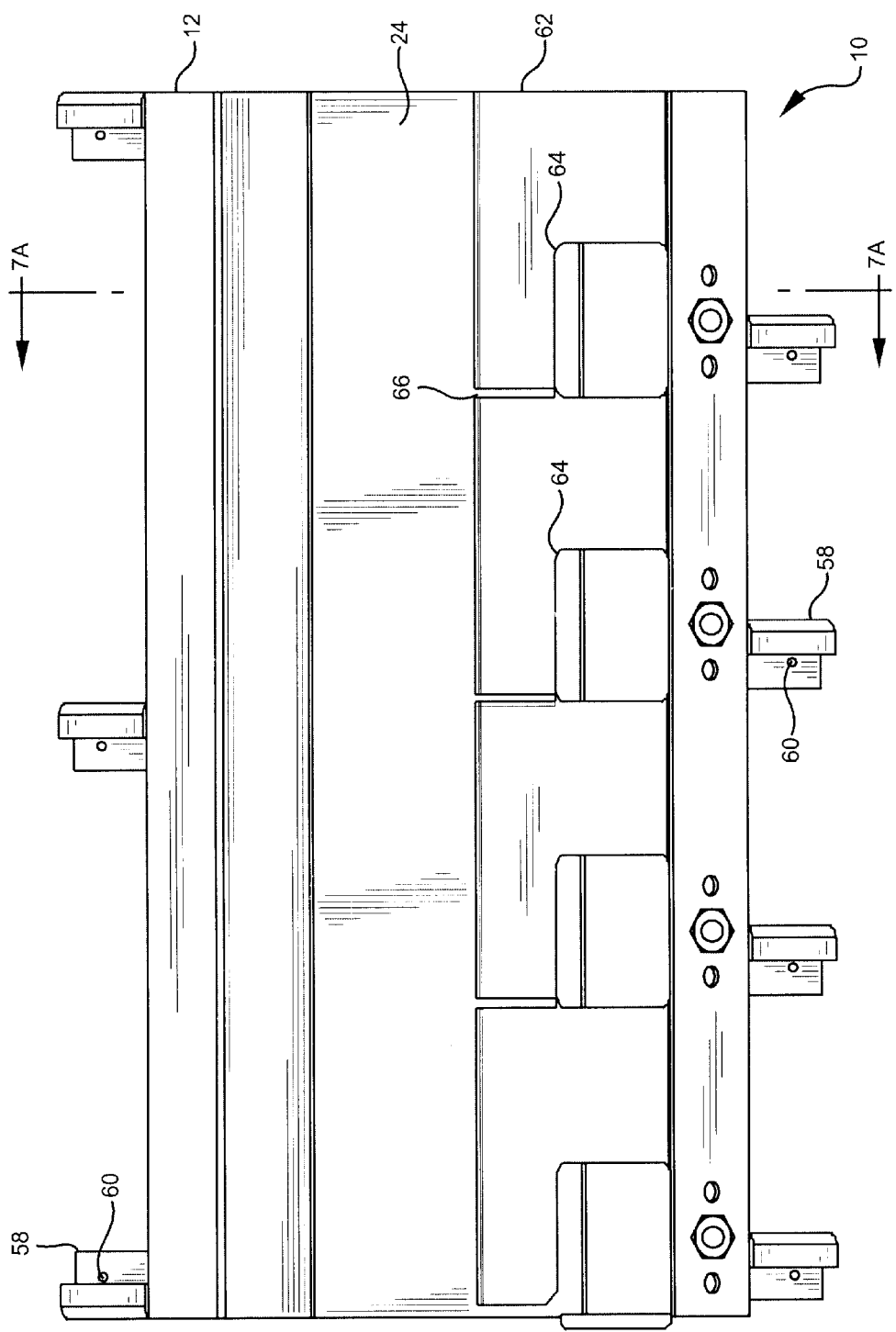
FIG. 7 is a top view of the distributing frame shown in FIG. 6.

The upper trough 18 is connected to the second end 28 of each of the plurality of posts 14 and runs substantially horizontally. The upper trough 18 is formed by walls including a third side wall 36 which define a channel as shown in FIG. 4. As shown in FIGS. 1, 6, and 7, a bottom wall 62 is formed with a plurality of openings 64 which are configured to be in communication with the plurality of top troughs 22. Preferably, the upper trough 18 is formed with a plurality of slots 66 which cut through the walls of the upper trough 18 to communicate with the plurality of openings 64 as shown in FIGS. 1 and 7. The slots 66 make it easier to thread the jumper wires through the openings 64.

Figure 7A:
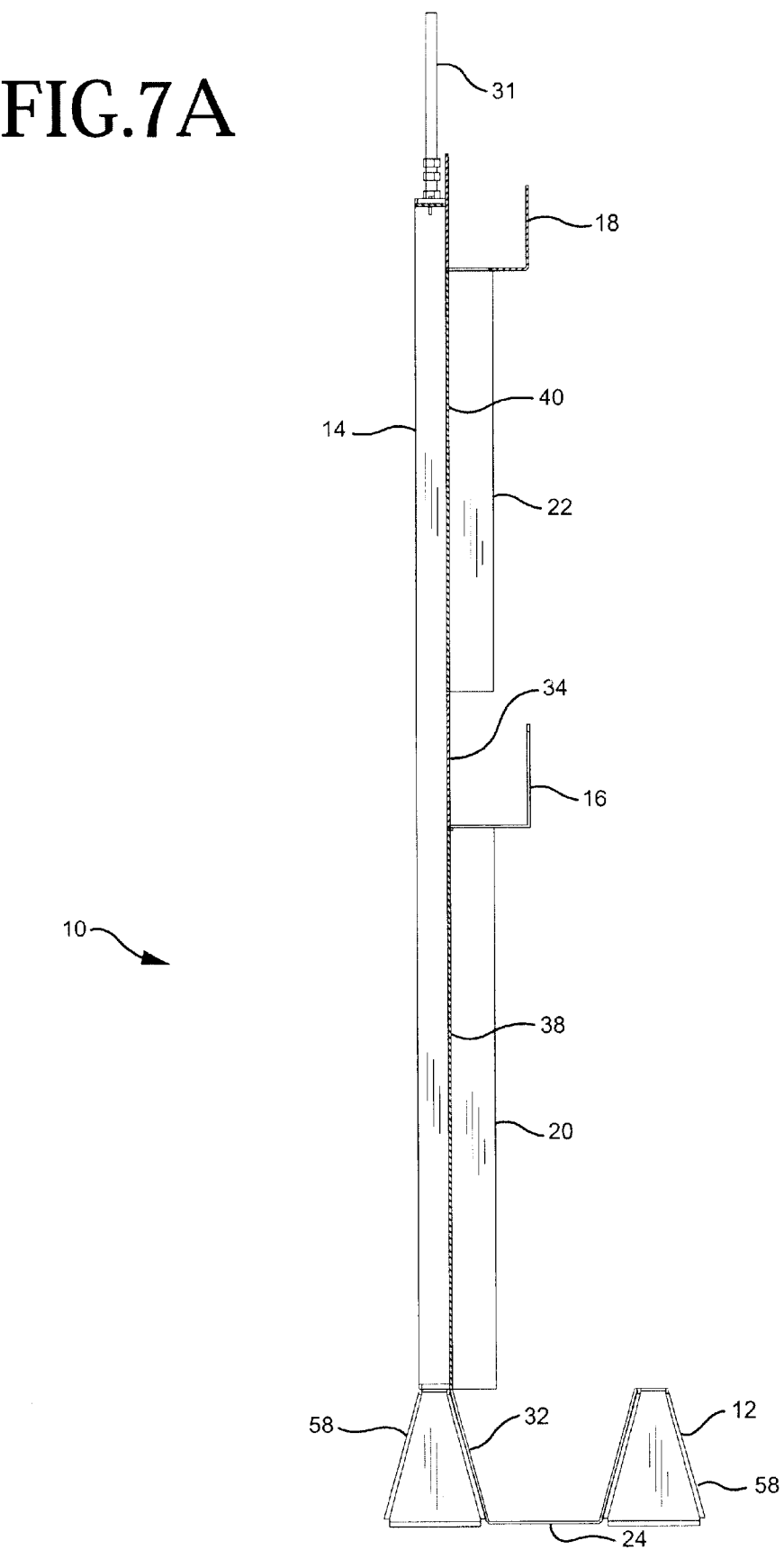
FIG. 7A is a sectional view of the distributing frame shown in FIG. 6 taken along line 7A—7A.

Each of the plurality of bottom troughs 20 are connected to one of the plurality of posts 14 to run substantially vertically while intersecting both the center trough 16 and upper trough 18. Referring to FIGS. 2, 3 and 7A each bottom trough 20 has walls including a first bottom panel 38 which define a channel. The walls of the bottom trough 20 are dimensioned to communicate with the vertical-openings 68 formed in the center trough 16 as shown in FIGS. 1 and 3.

Each of the plurality of top troughs 22 is connected to one of the plurality of posts 14 to run substantially vertically while intersecting both the center trough 16 and the upper trough 18. The top troughs 22 are formed by walls including a second bottom panel 40 which define a channel as shown in FIGS. 2, 3 and 7A. The top troughs 22 are dimensioned to communicate with both the vertical-trough openings 68 formed in the center trough 16 and the plurality of openings 64 formed in upper trough 18 as shown in FIGS. 1, 3, 7, and 7A.

Figure 9:
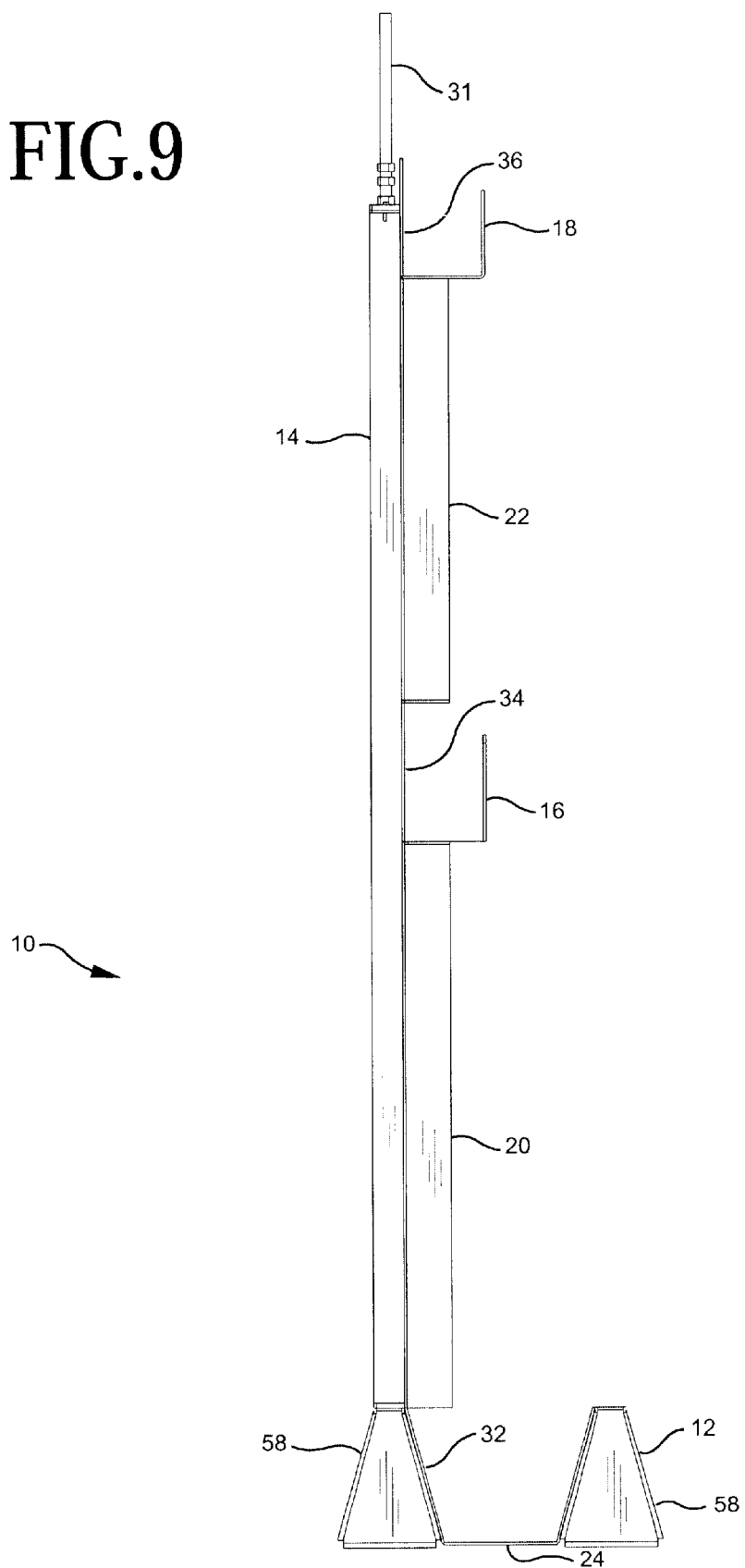
FIG. 9 is a side elevational view of the distributing frame shown in FIG. 6.

In the present invention, all of the troughs—lower trough 24, center trough 16, upper trough 18, bottom troughs 20 and top troughs 22—are configured to intersect for improved communication therebetween. Preferably the troughs are arranged so that the second side wall 34 of the center trough 16 and the third side wall 36 of the upper trough 18 define a plane with the first and second bottom panels 38, 40 of the bottom and top troughs 20, 22 being arranged in the plane as shown in FIGS. 2, 7A, and 9. Most preferably, the first side wall 32 of the lower trough 24 is arranged to intersect the plane at the first end 26 at each of the plurality of posts 14. Preferably the top and bottom troughs 20, 22 are provided with clips for retaining the jumper wires within the channel portion of the troughs 20, 22.

In an alternative form of the invention, the center trough 16 is not provided. In this form of the invention, the plurality of bottom and top troughs 20, 22 are replaced by a single longitudinal trough. Each of the plurality of longitudinal troughs is connected to one of the plurality of posts 14 to run substantially vertically while intersecting both the lower trough 24 and the upper trough 18. The longitudinal troughs are formed by walls including a bottom panel which define a channel in a similar manner as shown in FIGS. 1, 3, 7A, and 9 for the bottom and top troughs 20, 22. The longitudinal troughs are dimensioned to communicate with the the plurality of openings 64 formed in the upper trough 18.

Figure 13:
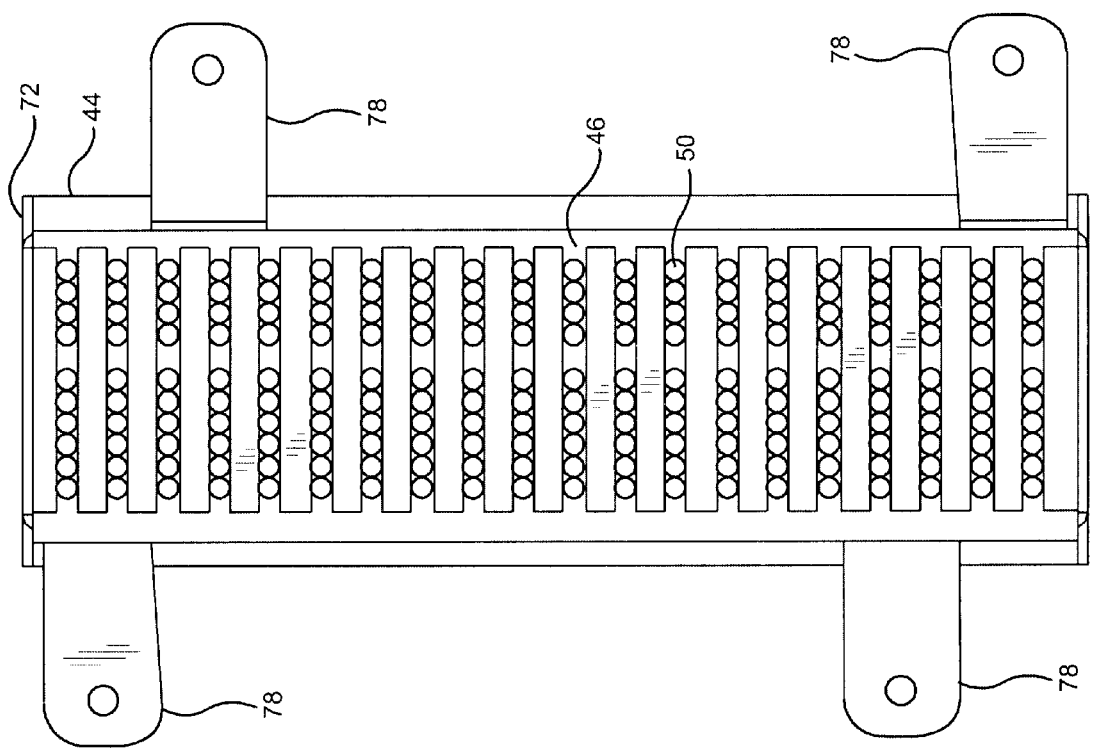
FIG. 13 is a front elevational view of the subassembly shown in FIG. 10.
Figure 14:
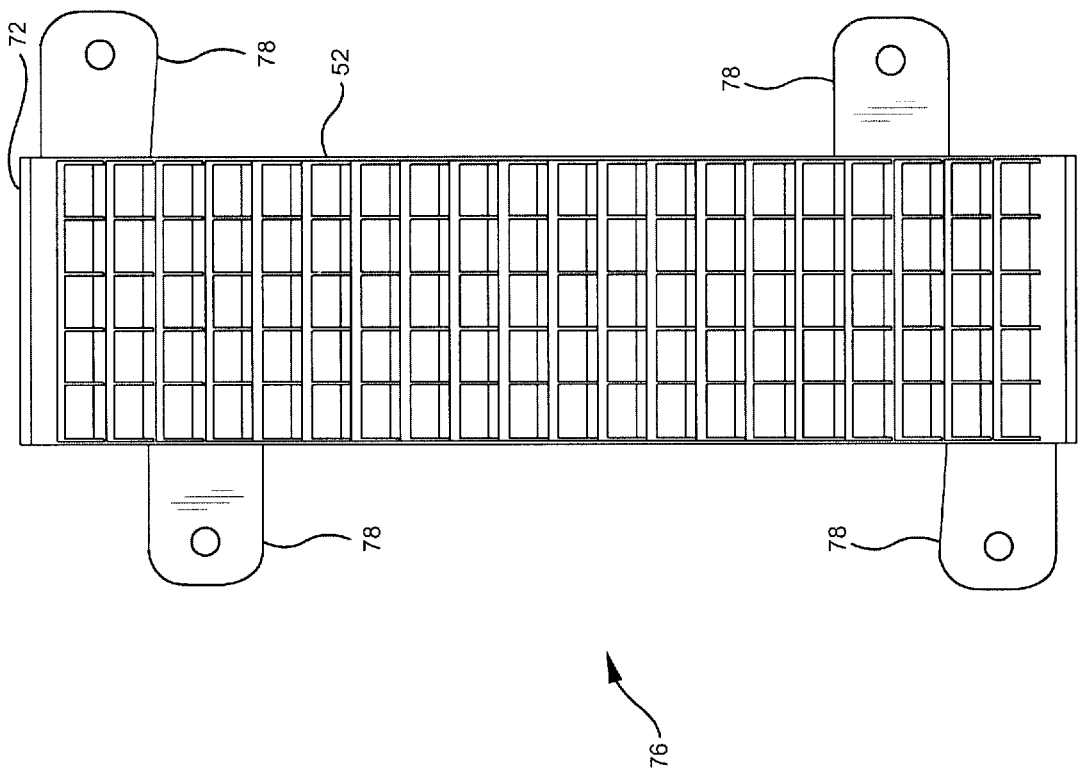
FIG. 14 is a rear elevational view of the subassembly shown in FIG. 10.
Figure 15:
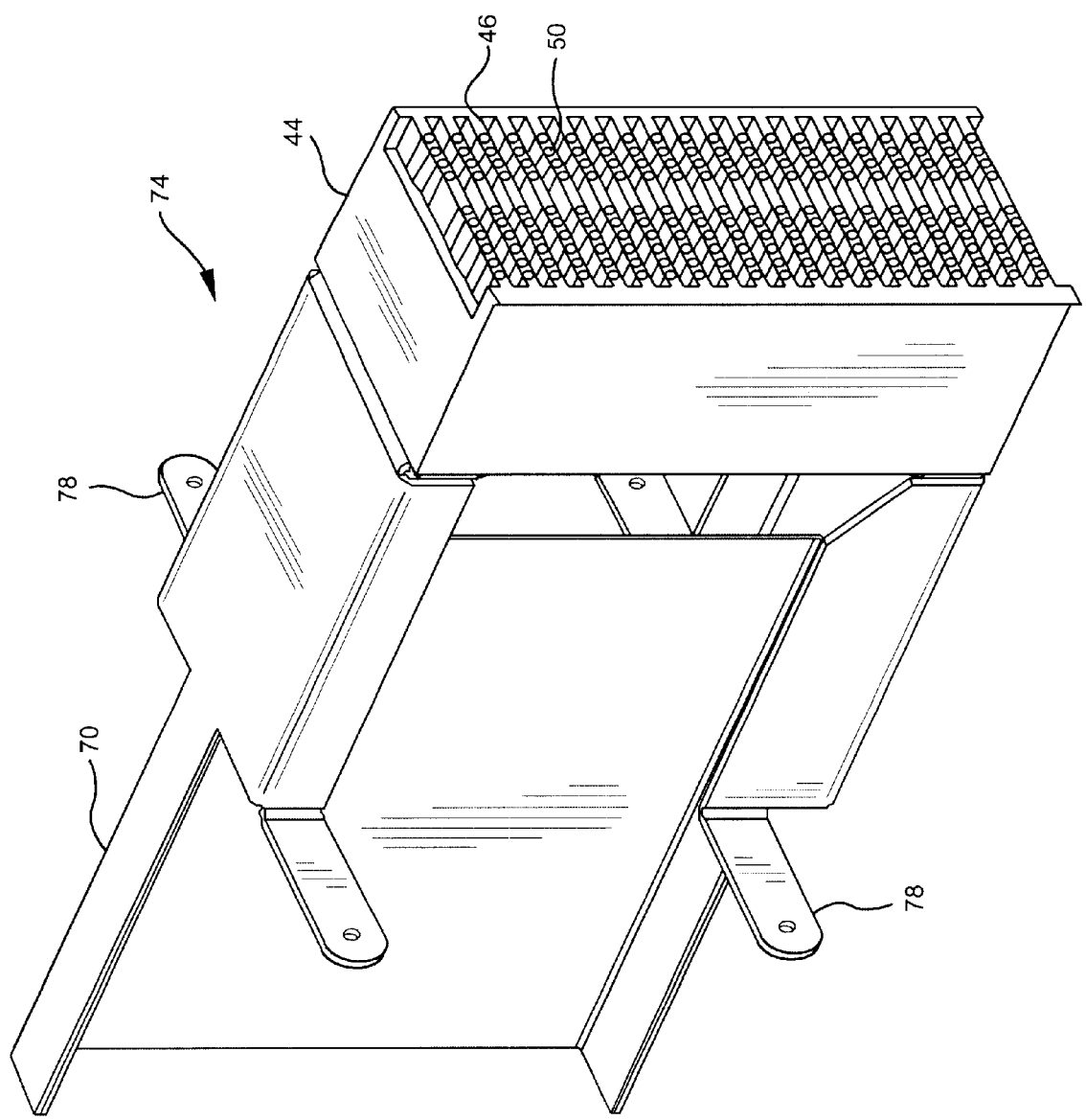
FIG. 15 is a front perspective view of a telephone connector block subassembly.
Figure 16:
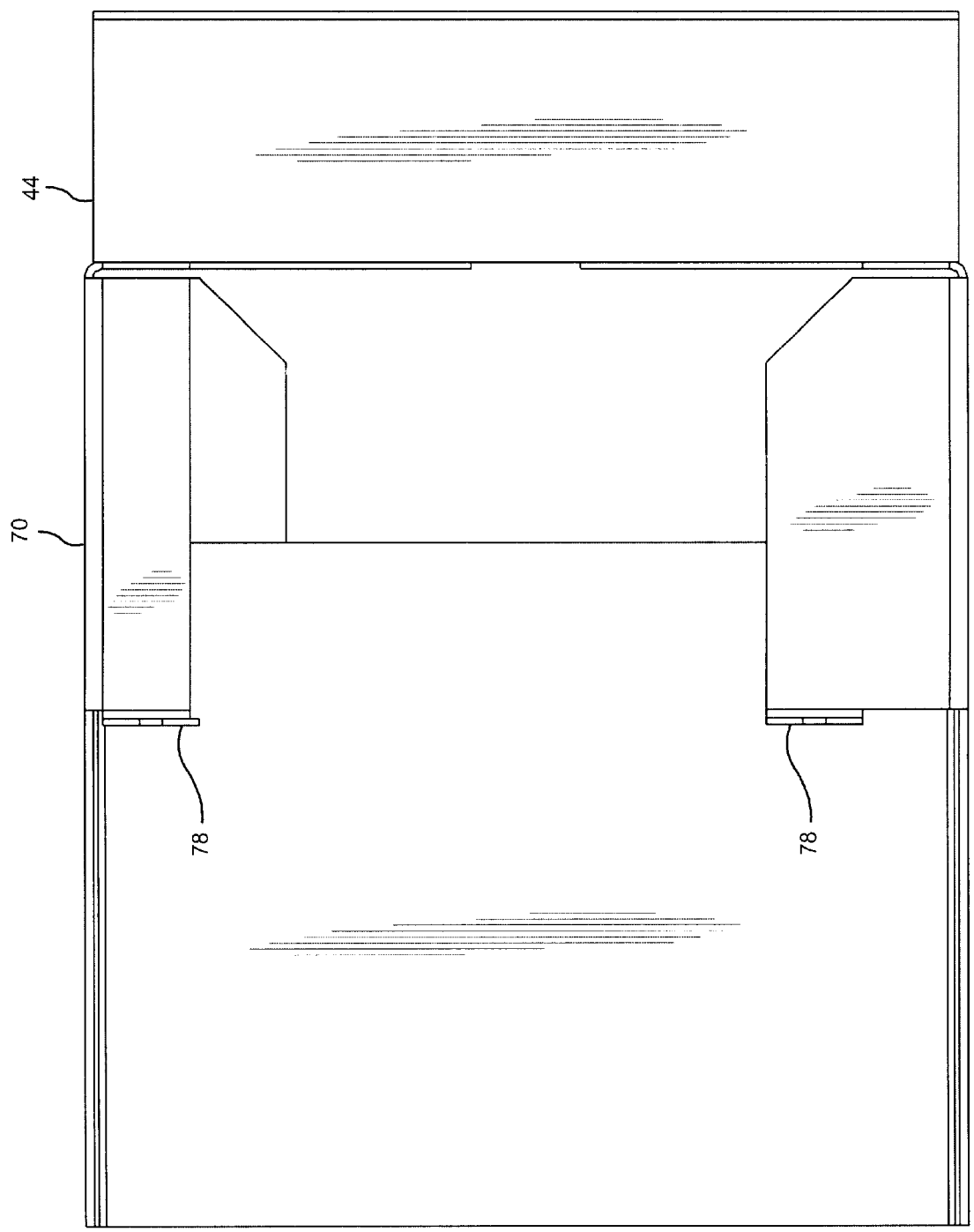
FIG. 16 is a side elevational view of the subassembly shown in FIG. 15.
Figure 17:
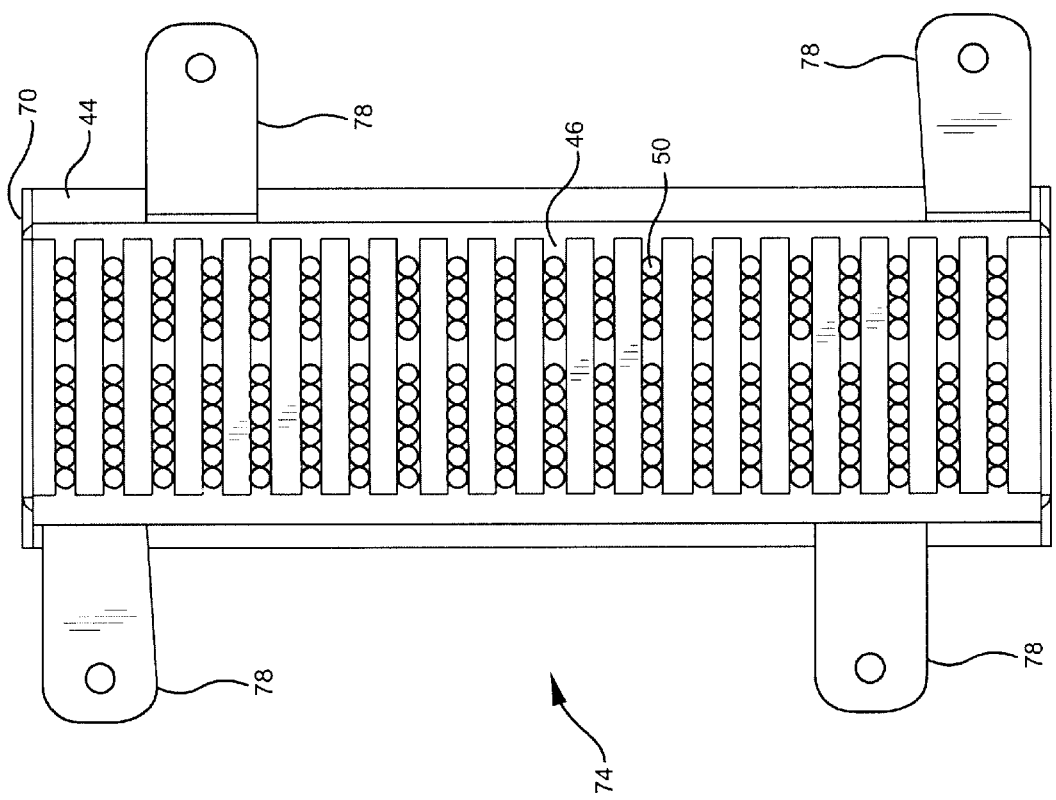
FIG. 17 is a front elevational view of the subassembly shown in FIG. 15.
Figure 18:
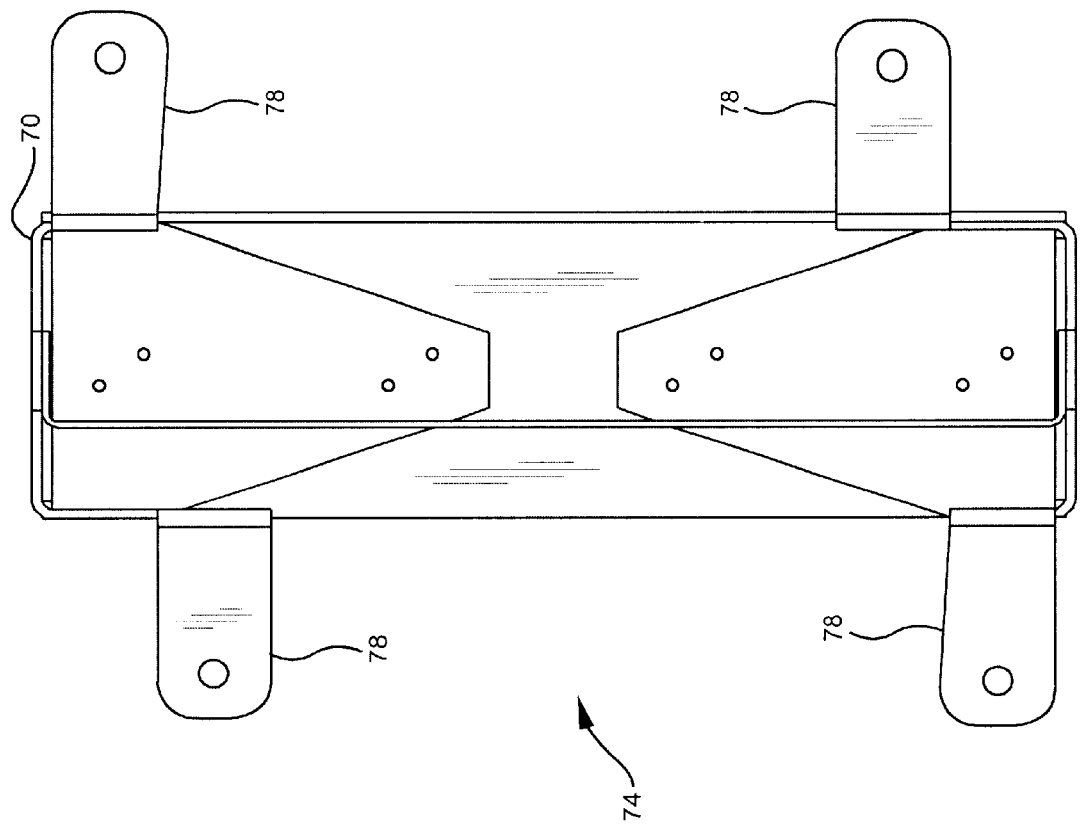
FIG. 18 is a rear elevational view of the subassembly shown in FIG. 15.

In one form of the invention, the frame 10 includes a plurality of telephone connector blocks 44 which are arranged between and connected to a pair of the plurality of posts 14. Each of the blocks 44 have a first face 46 that is located in a second plane that intersects the lower trough 24 as shown in FIG. 4. The first face 46 has a plurality of connectors 50 located thereon as shown in FIGS. 13 and 17 for electrically coupling jumper wires that run between a pair of telephone connector blocks. The details of the connectors are well known in the art and could include wire wrap pins and quick clip connectors (insulation displacement contacts). Preferably at least one of the blocks 44 will include an electrically coupled protector field 52. The protector field 52 has a second face 54 which is located in a third plane that is parallel to the second plane established by the first face 46 of the blocks 44. Since all of the connectors 50 will be located on the same side of the frame 10 corresponding to the second plane, the frame can be administered by a single person on the front of the frame 10. The administration in connection with the protector field 52 is performed on the rear of the frame 10.

The internal structure of the telephone connector blocks 44 are well known in the art. Connector blocks 44 suitable for use in connection with the present invention are described in the connector block patents identified above. In addition, suitable connector blocks for use in the present invention are available through Porta Systems Corp. and are identified in their publication the "Frame Book," which is incorporated herein by reference. Examples of blocks suitable for use in the present invention are Porta Systems' model numbers 508PFQ, 508PFBW and 508PFX. These models include both the connector block 44 and protective field 52 arranged in an orthoganol relationship to each other. The separate components of each model can be used in the present invention as described above. In addition, the protector field 52 is provided with a plurality of protector modules known in the art for protection of the cable pairs, line equipment and personnel from high-voltage surges. The protector modules can include test points to identify and test for faults located in the cable pairs. Protector modules suitable for use with the invention are also identified in the "Frame Book".

Figure 10:
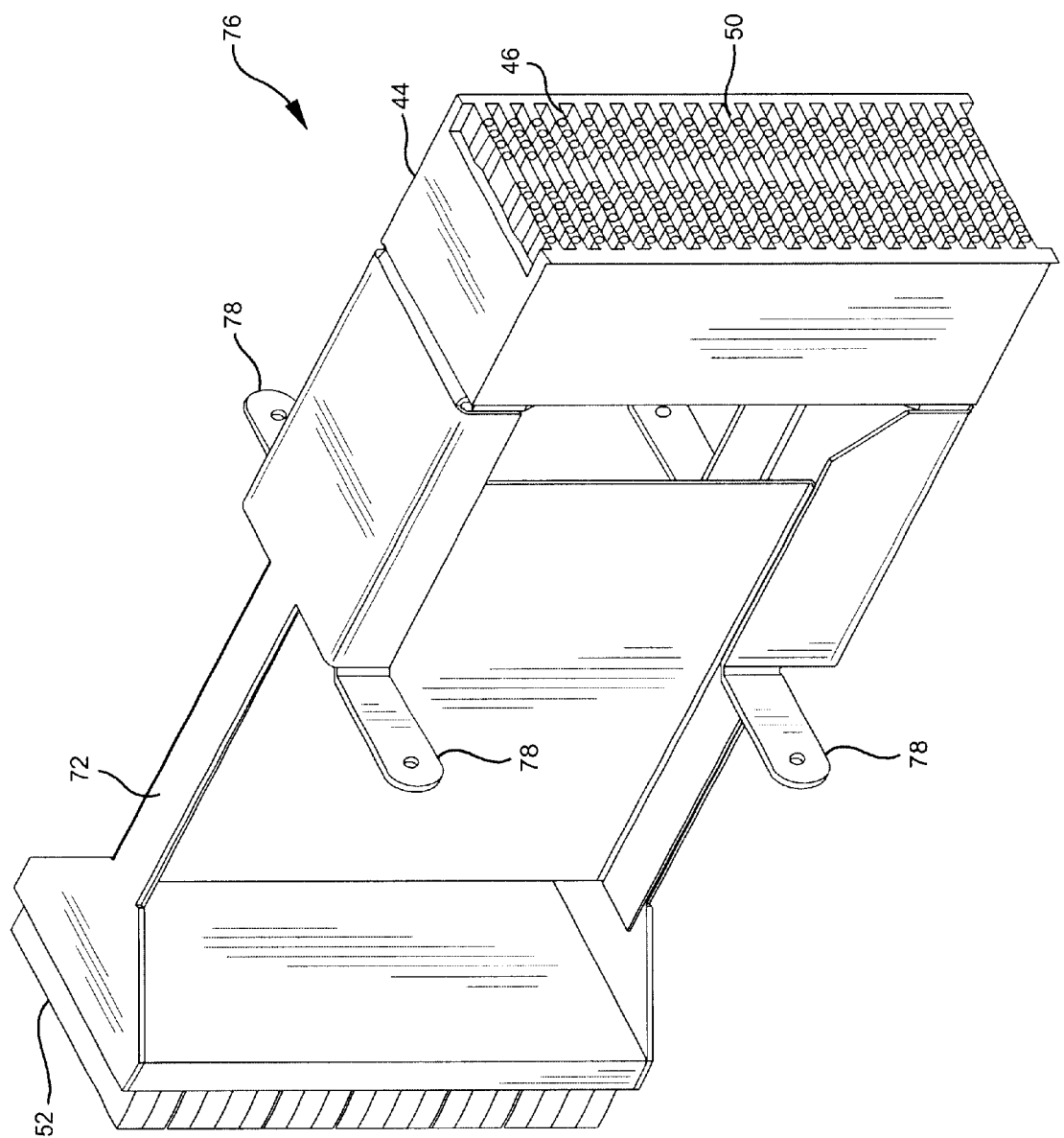
FIG. 10 is a front perspective view of a protected telephone connector block subassembly.
Figure 11:
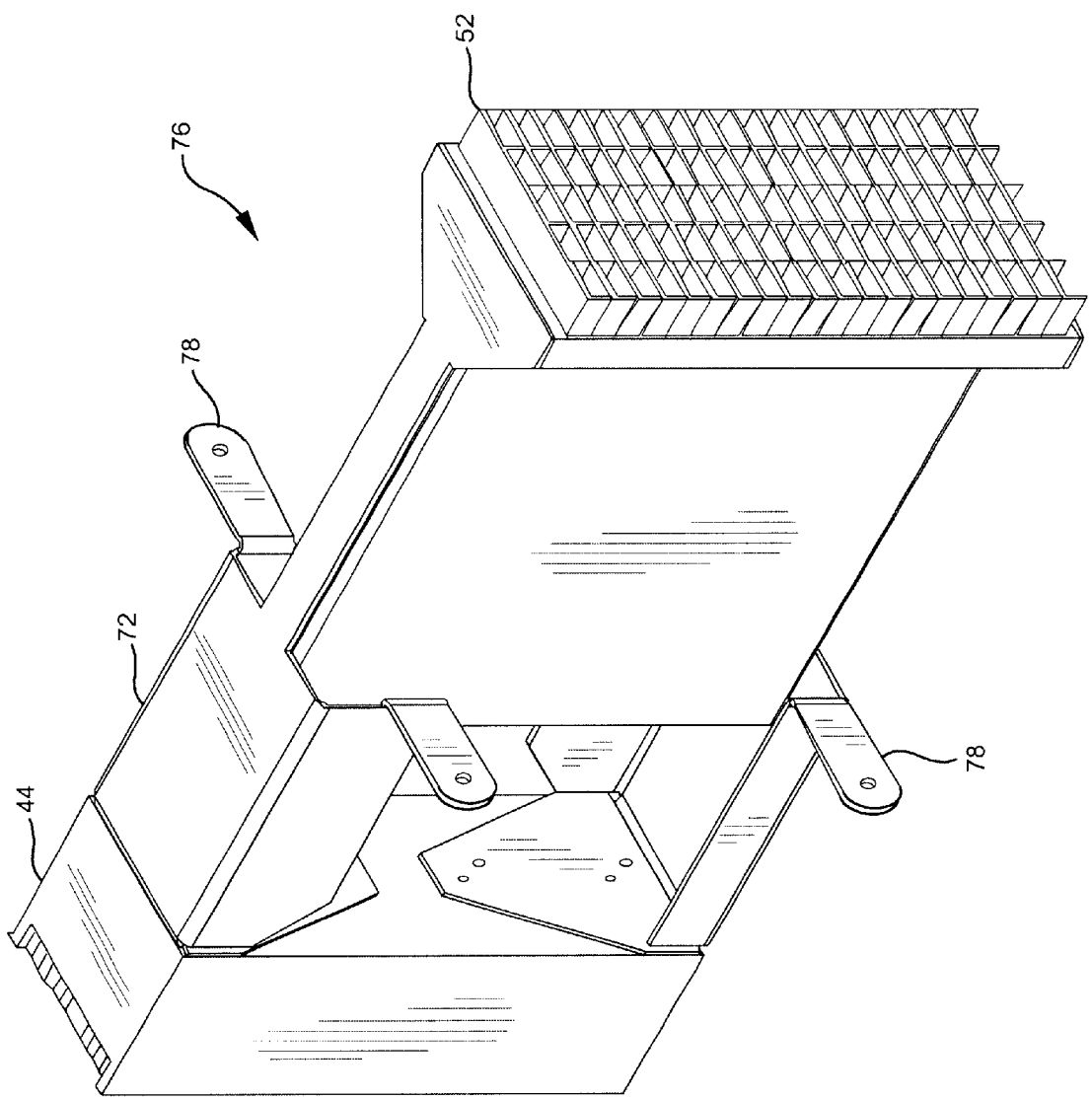
FIG. 11 is a rear perspective view of the subassembly shown in FIG. 10.
Figure 12:
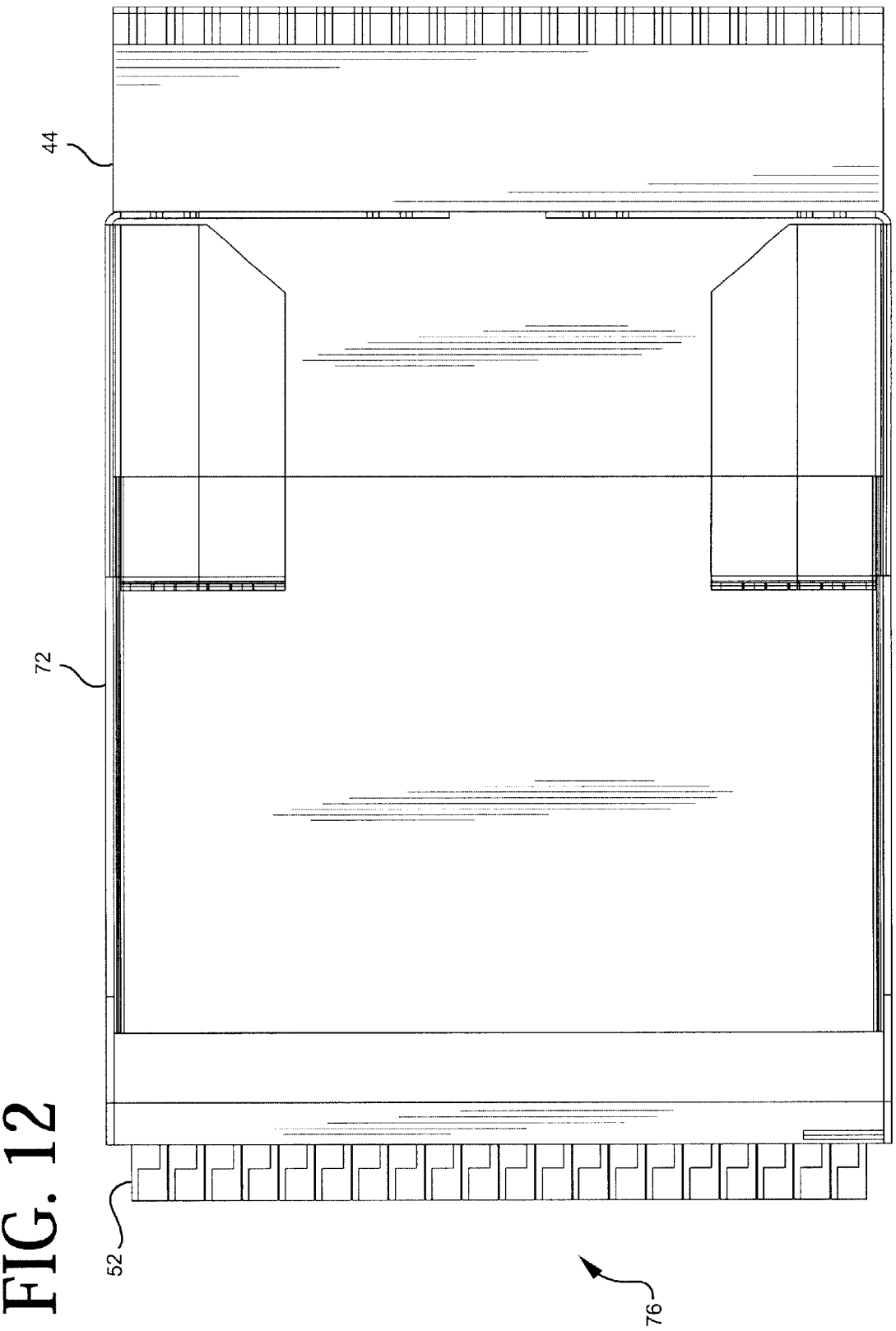
FIG. 12 is a side elevational view the subassembly shown in FIG. 10.

Referring now to FIGS. 10 through 18, the telephone connector blocks 44 are preferably connected to subframes 70, 72 to create a telephone connector block subassembly 74 and a protected telephone connector block subassembly 76 respectively. The subframes 70, 72 are formed preferably from sheet metal and include a mounting arrangement for fastening the subassemblies 74, 76 to the frame 10. Preferably the mounting arrangement includes a plurality of ears 78 for connecting to a pair of posts 14. The protected subassembly 76 includes the protector field 52 mounted on the end opposite the connector block 44 as shown in FIG. 10. Preferably the mounting arrangement for both the telephone connector block subassembly 74 and protected telephone connector block subassembly 76 are similarly configured so that the subassemblies 74, 76 are interchangeable. This feature provides great flexibility to users when determining the ratio of outside plant lines to inside plant lines. More specifically, the user can now minimize the amount of wasted space on a frame 10 by selecting the precise number of unprotected and protected subassemblies 74, 76 to suit their needs.

Referring again to FIGS. 1 and 2, the present invention generally contemplates that protected subassemblies 76 will be installed vertically stacked between the lower trough 12 and the center trough 16 while unprotected subassemblies 74 will be installed between the center trough 16 and the upper trough 18. Outside plant cable pairs will generally be connected to the protected subassemblies 76 while inside plant cable pairs will generally be connected to the unprotected subassemblies 74. The invention can also be used in applications where the users provide the protection on the inside plant cable pairs. Alternatively, the present invention can be equipped with all unprotected subassemblies 74 when protection is either not required or provided by an alternative means. As described above, the connections to the connector block 44 or protector fields 52 are generally made with either a quick clip, bifurcated quick clip or wire wrap pin connector. Preferably the subassemblies 74, 76 include an intermediate electrical connector that is prewired to the blocks 44 and protector field 52 to facilitate the connection in the field to the cable pairs. The jumper wire connections are preferably the quick clip style because less skill is required for field personnel to implement. The jumper wire connections are made at the first face 46 of the blocks 44 to electrically couple an unprotected subassembly 74 to a protected subassembly 76. The threading of the jumper wires through the troughs of the frame 10 is made easier by having all of the troughs arranged to intersect.

The present invention has been illustrated in the drawings with a base 12, a center trough 16 and an upper trough 18 all having lengths to accommodate three (3) bays of subassemblies 74, 76 with a total of seven (7) subassemblies per bay. It should be understood that the lengths of these members could be increased or shortened depending upon the needs of the user. This is particularly advantageous because the frames in the prior art generally require much wider minimum bay width requirements. In certain installations where frames are being installed in existing buidings, the size of the frame can sometimes preclude its use because the frame cannot be transported to the installation site. With the present invention, the user can tailor the frame 10 to maximize the use of the floor space allocated for the frame 10 by selecting a variety of modular bay widths. When using the subframe 70, 72 the minimum single bay width is the length between a pair of posts 14. In addition, the length of the posts 14 can also be increased or shortened depending upon the needs of the user to alter the number of subassemblies 74, 76 per bay.

Although illustrative embodiments of the present invention have been described herein with reference to the accompanying drawings, it is to be understood that the invention is not limited to those precise embodiments, and that various other changes and modifications may be effected by one skilled in the art without departing from the scope or spirit of the invention.

What is claimed is:

1. A modular distributing frame for supporting a plurality of telephone connector blocks which interface inside and outside cable pairs through wire jumpers electrically coupled to the plurality of telephone connector blocks, said frame comprising:

a base forming a lower trough which runs substantially horizontally;

a plurality of posts for supporting the plurality of telephone connector blocks, each of said posts having a first end and a second end, said first end being connected to said base;

an upper trough connected to said second end of each of said posts and running substantially horizontally; and a plurality of longitudinal troughs, each of said longitudinal troughs being connected to one of said plurality of posts while running substantially vertically and intersecting said lower trough and said upper trough.

2. A modular distributing frame as defined by claim 1, wherein:

said lower trough has a first side wall;

said upper trough has a third side wall; and each of said longitudinal troughs has a bottom panel, with said third side wall and said bottom panels defining a plane with said first side wall being arranged to intersect said plane at said first end of each of said plurality of posts.

3. A modular distributing frame as defined by claim 1, wherein at least one of said plurality of posts has a rectangular tubular cross section.

4. A modular distributing frame for supporting a plurality of telephone connector blocks which interface inside and outside cable pairs through wire jumpers electrically coupled to the plurality of telephone connector blocks, said frame comprising:

a base forming a lower trough which runs substantially horizontally;

a plurality of posts for supporting the plurality of telephone connector blocks, each of said posts having a first end, a second end, and an intermediate portion, said first end being connected to said base;

a center trough connected to said intermediate portion of each of said posts and running substantially horizontally;

an upper trough connected to said second end of each of said posts and running substantially horizontally;

a plurality of bottom troughs, each of said bottom troughs being connected to one of said plurality of posts while running substantially vertically and intersecting said lower trough and said center trough; and a plurality of top troughs, each of said top troughs being connected to one of said plurality of posts while running substantially vertically and intersecting said center trough and said upper trough.

5. A modular distributing frame as defined by claim 4, wherein:

said center trough has a second side wall;

said upper trough has a third side wall;

each of said bottom troughs has a first bottom panel; and each of said top troughs has a second bottom panel, with said second and third side walls defining a plane and said first and second bottom panels being arranged in said plane.

6. A modular distributing frame as defined by claim 5, wherein said lower trough has a first side wall that is arranged to intersect said plane at said first end of each of said plurality of posts.

7. A modular distributing frame as defined by claim 5, wherein at least one of said plurality of posts has a rectangular tubular cross section.

8. A modular distributing frame for interfacing inside and outside cable pairs through wire jumpers electrically coupled to the frame, said frame comprising:

a base forming a lower trough which runs substantially horizontally;

a plurality of posts for supporting the plurality of telephone connector blocks, each of said posts having a first end and a second end, said first end being connected to said base;

an upper trough connected to said second end of each of said posts and running substantially horizontally;

a plurality of longitudinal troughs, each of said longitudinal troughs being connected to one of said plurality of posts while running substantially vertically and intersecting said lower trough and said upper trough; and a plurality of telephone connector blocks arranged between and connected to a pair of said plurality of posts:

each of said blocks having a first face that is located in a second plane that intersects said lower trough and having a plurality of connectors located on said first face for electrically coupling the jumper wires.

9. A modular distributing frame as defined by claim 8, wherein at least one of said blocks includes an electrically coupled protector field having a second face that is located in a third plane that is parallel to said second plane.

10. A modular distributing frame as defined by claim 8, wherein:

said lower trough has a first side wall;

said upper trough has a third side wall; and each of said longitudinal troughs has a bottom panel, with said third side wall and said bottom panels defining a plane with said first side wall being arranged to intersect said plane at said first end of each of said plurality of posts.

11. A modular distributing frame as defined by claim 8, further comprising a plurality of subframes, wherein each of said blocks is connected to one of said plurality of subframes which is connected to a pair of said plurality of posts.

12. A modular distributing frame as defined by claim 11, wherein at least one of said blocks includes an electrically coupled protector field attached to said subframe, said protector field having a second face that is located in a third plane that is parallel to said second plane.

13. A modular distributing frame as defined by claim 12, wherein each of said plurality of subframes have a similarly configured mounting arrangement whereby each subframe is interchangeable for attachment to said posts.

14. A modular distributing frame for interfacing inside and outside cable pairs through wire jumpers electrically coupled to the frame, said frame comprising:

a base forming a lower trough which runs substantially horizontally;

a plurality of posts, each of said posts having a first end, a second end, and an intermediate portion, said first end being connected to said base;

a center trough connected to said intermediate portion of each of said posts and running substantially horizontally;

an upper trough connected to said second end of each of said posts and running substantially horizontally;

a plurality of bottom troughs, each of said bottom troughs being connected to one of said plurality of posts while running substantially vertically and intersecting said lower trough and said center trough;

a plurality of top troughs, each of said top troughs being connected to one of said plurality of posts while running substantially vertically and intersecting said center trough and said upper trough; and a plurality of telephone connector blocks arranged between and connected to a pair of said plurality of posts:

each of said blocks having a first face that is located in a second plane that intersects said lower trough and having a plurality of connectors located on said first face for electrically coupling the jumper wires.

15. A modular distributing frame as defined by claim 14, wherein at least one of said blocks includes an electrically coupled protector field having a second face that is located in a third plane that is parallel to said second plane.

16. A modular distributing frame as defined by claim 15, wherein said lower trough has a first side wall that is arranged to intersect said plane at said first end of each of said plurality of posts.

17. A modular distributing frame as defined by claim 14, wherein:

said center trough has a second side wall;

said upper trough has a third side wall;

each of said bottom troughs has a first bottom panel; and each of said top troughs has a second bottom panel, with said second and third side walls defining a plane and said first and second bottom panels being arranged in said plane.

18. A modular distributing frame as defined by claim 14, further comprising a plurality of subframes, wherein each of said blocks is connected to one of said plurality of subframes which is connected to a pair of said plurality of posts.

19. A modular distributing frame as defined by claim 18, wherein at least one of said blocks includes an electrically coupled protector field attached to said subframe, said protector field having a second face that is located in a third plane that is parallel to said second plane.

20. A modular distributing frame as defined by claim 19, wherein each of said plurality of subframes have a similarly configured mounting arrangement whereby each subframe is interchangeable for attachment to said posts.

* * * * *